May 4, 1937.                J. T. DUARTE                2,079,281
                      COOKING VESSEL ATTACHMENT
                        Filed March 25, 1936

INVENTOR.
John T. Duarte
BY
Murray M Zugelter
ATTORNEYS.

Patented May 4, 1937

2,079,281

UNITED STATES PATENT OFFICE 2,079,281

COOKING VESSEL ATTACHMENT

John T. Duarte, Honolulu, Territory of Hawaii

Application March 25, 1936, Serial No. 70,821

6 Claims. (Cl. 53—1)

The present invention relates to a cooking vessel attachment, the primary purpose of which is to catch any overflow from cooking vessels and the like.

An object of the invention is to provide an attachment of the kind referred to, which may be detachably mounted upon different vessels of the same diameter, and which will not interfere with the use of the regular lid of such vessel.

Another object is to provide a device of the character stated, which will catch overflow from foods or other substances being cooked, so as to prevent defacing the vessel and the cooking stove, and eliminate clogging the burners thereof.

More specifically, it is an object of the present invention to provide a ring-shaped overflow trough adapted to seat upon the upper flange or edge of a vessel, in the same manner as would the lid thereof, so that a tight fit is maintained between the overflow device and the upper edge of the cooking vessel.

The foregoing and other objects are attained by the means described herein and disclosed in the accompanying drawing, in which.

Figure 1:
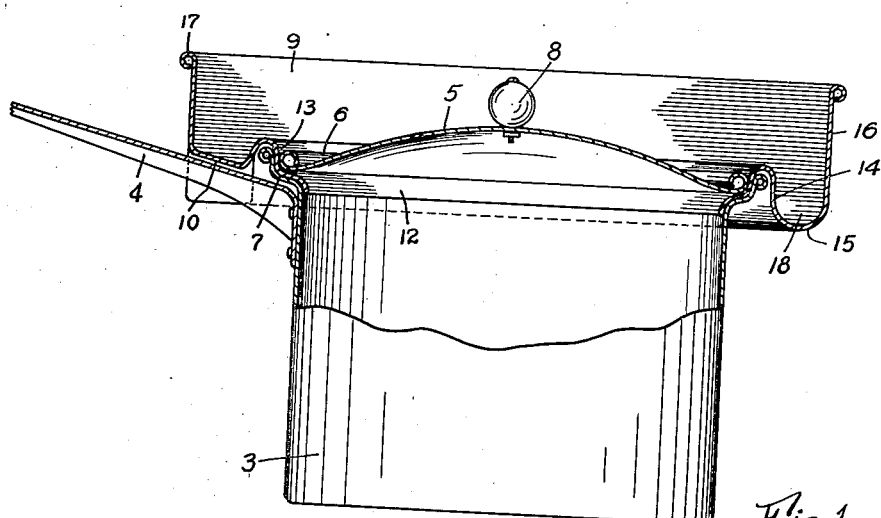
Fig. 1 is a vertical cross sectional view showing the attachment applied to a cooking vessel, with the lid of the vessel in position thereon.
Figure 2:
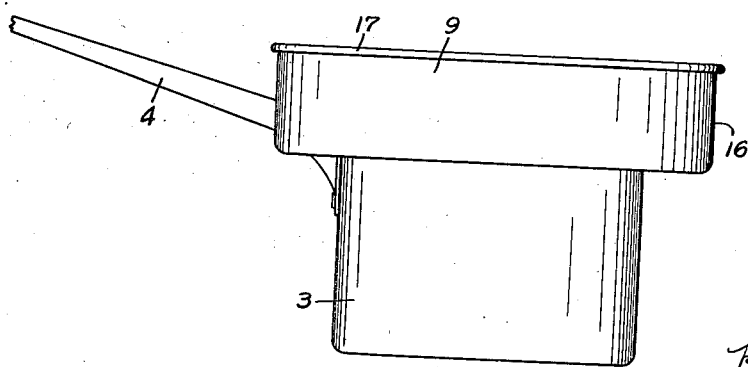
Fig. 2 is an elevational view of the Fig. 1 assembly.

Devices for catching overflowing material from cooking vessels have been proposed heretofore, but such devices have been objectionable for various reasons. For example, overflow channels have been applied to cooking vessels as integral parts thereof, so that detachment thereof is impossible, thereby resulting in loss of the advantage of selective use of the overflow device upon different vessels of corresponding sizes. Other overflow devices have been applied about the cooking vessel intermediate its bottom and its upper edge, with the disadvantage that any dents made in the vessel would render the overflow device useless as a means of preventing defacement of the vessel and the cooking stove or burners. Moreover, such devices require a very accurate fitting thereof to the vessel, and there exists always the likelihood that the overflow device will slide down over the side walls and rest upon the stove or burner grating. All the foregoing objections have been overcome in the present device, with the further advantage of simplicity of design and low manufacturing cost.

With reference to the accompanying drawing, wherein certain of the parts are somewhat enlarged in the interest of clarity, the character 3 indicates a cooking vessel of any known character, provided with a handle 4 and a lid 5. At the location 6, the lid ordinarily is provided with a peripheral flange adapted normally to rest within the annular groove or seat 7 formed around the top of the vessel. The lid ordinarily is provided with a suitable handle 8. The attachment 9, which is essentially an overflow trough, preferably is of circular ring shape, and has a recess 10 therein to fit over the handle 4 of the cooking vessel. As is evident, the recess 10 may be eliminated when the attachment is to be applied to cooking vessels having no handle, but by preference, the attachment is provided with such a recess because its presence is immaterial to the question of whether or not the cooking vessel is provided with a handle.

The attachment 9 has an inwardly and downwardly turned flange 12 of proper dimension whereby the seat 7 of the cooking utensil is substantially covered, the flange seating upon the seat of the vessel and providing a close joint therewith. The flange 12 preferably has approximately the same radial curvature as the seat 7. From the inner flange just mentioned, a wall 13 extends upwardly to a level above the level of the flange 7 of the vessel, and thereafter turns downwardly as at 14 to a level below the flange 7, as indicated at 15. The outer wall 16 extends from the lowermost level 15, to a suitable elevation determined by the bead 17, said bead being located well above the wall 13 and the top of the vessel. The trough 18 formed between the spaced walls 14 and 16 of the overflow attachment, may be of a desired capacity sufficient to take care of any expected amount of overflow from the vessel. Preferably, though not necessary, the recess 10 is so formed or extended, that the attachment may rest upon the handle of the vessel. It should be noted that the presence of the overflow attachment in no manner interferes with the use of the lid of the vessel, and in the event that the lid is of granite or enamelware, the weight of the lid assists in maintaining the overflow attachment upon the circumferential seat of the vessel. It is noteworthy that the overflow device may be attached and detached readily from the vessel and placed on different vessels of the same size. Furthermore, the device is adapted to fit vessels which have either straight or curved sides, whether the sides be vertical or angularly inclined. The effectiveness of the device, moreover, is not dependent upon the character of the sides of the vessel, and worn or damaged vessels can be made to fit the attachment by merely restoring the circular form of the upper edge thereof, if such edge be deformed.

It will be observed that the device of the invention may be inexpensively manufactured by means of a simple pressing or drawing operation, using as a blank any suitable metal. The appearance and utility of the device may be enhanced by plating the device, or by imparting a proper finish thereto.

It is to be understood that various modifications and changes in the structural details of the device may be made, within the scope of the appended claims, without departing from the spirit of the invention.

What is claimed is:

1. The combination of a cooking vessel having an upper circumferential edge upon which a lid is adapted to fit, a displaceable overflow attachment including an inner circumferential inverted channel-shaped flange of such dimension and form as to fit the circumferential edge of the vessel in the absence of the lid, an inclined wall substantially bounding the flange and providing a depressed annular recess for confining the lid when the latter is superposed upon the inverted channel-shaped flange, and walls on the attachment located exteriorly of said inclined wall and shaped to form a trough substantially surrounding the vessel.

2. The combination of a cooking vessel having an upper circumferential edge upon which a lid is adapted to fit, a displaceable overflow attachment including an inner circumferential inverted channel-shaped flange of such dimension and form as to fit the circumferential edge of the vessel in the absence of the lid, an inclined circumferential wall substantially bounding the flange and providing a means for confining the lid when the latter is superposed upon the inverted channel-shaped flange, walls on the attachment located exteriorly of said inclined wall and shaped to form a trough substantially surrounding the vessel, the trough being extended both above and below the level of the upper circumferential edge of the vessel.

3. As a new article of manufacture, a displaceable overflow catch attachment for cooking vessels, comprising an inner circumferential inverted channel-shaped flange of such dimension and form as to rest upon the upper edge of a cooking vessel, an inclined wall substantially bounding the flange and providing a means for surrounding and precluding horizontal shifting of a lid when superposed upon the inverted channel shaped flange of the attachment, and a wall on the attachment located exteriorly of said inclined wall and shaped to form a trough substantially surrounding the flange.

4. As a new article of manufacture, a displaceable overflow catch attachment for cooking vessels, comprising an inner circumferential inverted channel-shaped flange of such dimension and form as to rest upon the upper edge of a cooking vessel, an inclined wall substantially bounding the flange and providing an annular recessed seat for precluding horizontal shifting of a lid when superposed upon the inverted channel shaped flange of the attachment, and a wall on the attachment located exteriorly of said inclined wall and shaped to form a trough substantially surrounding the flange, the trough being extended below the level of the channel-shaped flange and including a recessed portion for receiving a vessel handle, said recessed portion being in the form of a transverse channel depressed upwardly in the material of the trough to furnish sides, and an upper wall integral with the trough and overlying the vessel handle, whereby the handle is easily applied as well as protected from overflow of the vessel.

5. As a new article of manufacture, a displaceable overflow catch attachment for cooking vessels, comprising an inner circumferential inverted channel-shaped flange of such dimension and form as to rest upon the upper edge of a cooking vessel, and a wall on the attachment located exteriorly of said flange and shaped to form a trough substantially surrounding the flange and the vessel exterior, the trough being extended below the level of the flange and including an open-bottomed recess for receiving a vessel handle, said recess being in the form of a transverse dent in the bottom of the trough.

6. As a new article of manufacture, a displaceable overflow catch attachment for cooking vessels, comprising an inner circumferential inverted channel-shaped flange of such dimension and form as to rest upon the upper edge of a cooking vessel, and a wall on the attachment located exteriorly of said flange and shaped to form a trough substantially surrounding the flange and the vessel exterior, the trough being extended below the level of the flange and including an open-bottomed recess for receiving a vessel handle, said recess being in the form of a transverse dent in the bottom of the trough providing only three walls about the handle, all of said walls being integral with the material of the trough, with one of said walls overlying the handle and the others disposed at opposite sides of the handle to preclude rotation of the attachment.

JOHN T. DUARTE.